Aug. 17, 1965

C. H. GLEASON ETAL 3,201,619

NUCLEAR THERMIONIC CONVERTER

Filed June 7, 1960

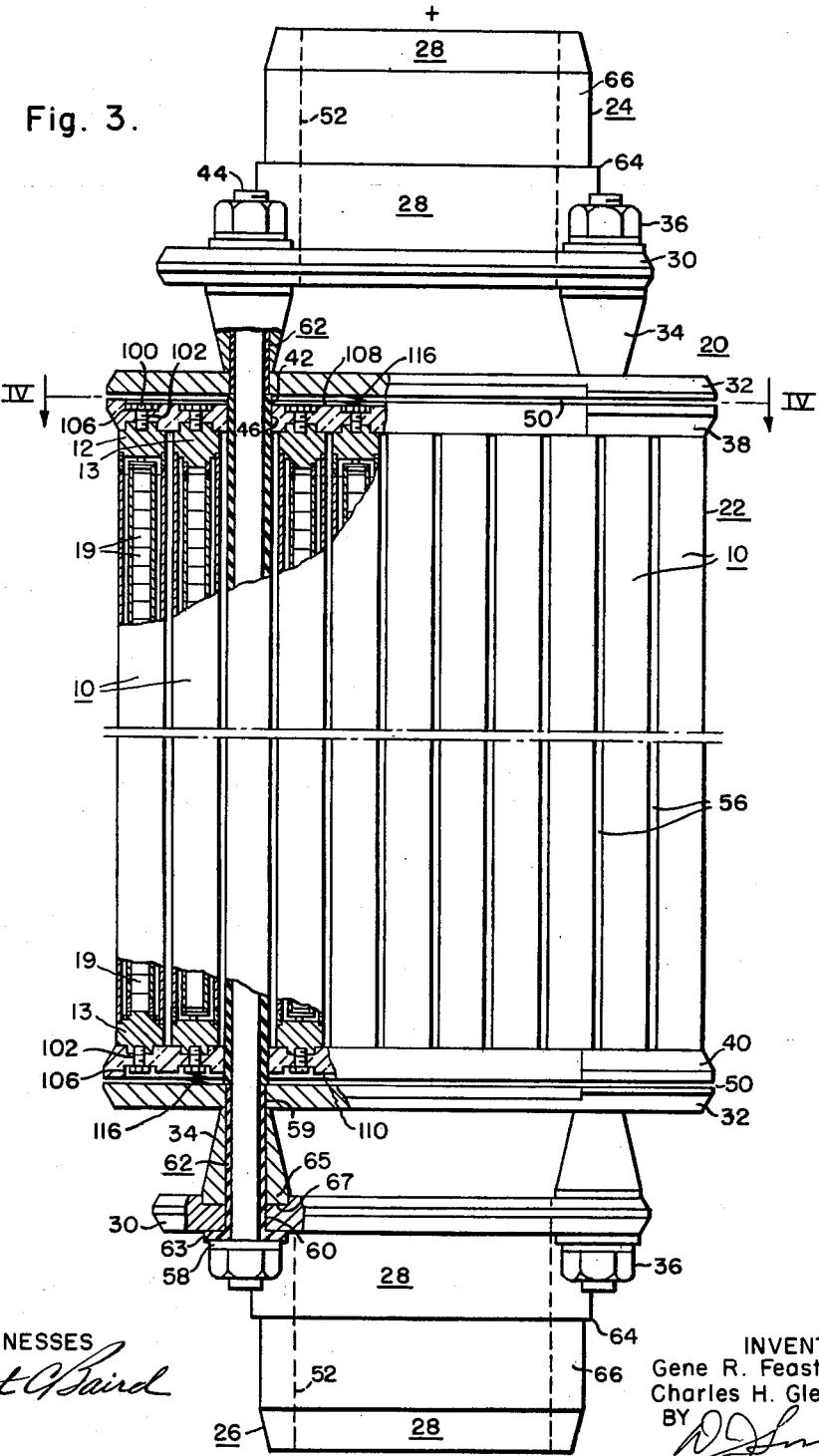

United States Patent Office 3,201,619
Patented Aug. 17, 1965

3,201,619
NUCLEAR THERMIONIC CONVERTER
Charles H. Gleason and Gene R. Feaster, Horseheads, N.Y., assignors to Westinghouse Electric Corporation, East Pittsburgh, Pa., a corporation of Pennsylvania
Filed June 7, 1960, Ser. No. 34,410
6 Claims. (Cl. 310—4)

The present invention relates generally to thermionic converters and particularly to a device of this character for converting thermal energy developed by a nuclear reactor directly into electrical energy.

The invention is further adapted for incorporation into various types of heterogeneous nuclear reactors in which a nuclear chain reaction is induced within an array of relatively stationary fuel elements contained within the reactor. One or more of the fissionable isotopes $U^{233}$, $U^{235}$ and $PU^{239}$ are incorporated within the fuel elements and the chain reaction is propagated by neutrons during operation of the reactor, in a well known manner. The fuel elements usually are spaced relative to one another within the interior of the reactor so that a coolant fluid such as pressurized water, carbon dioxide, helium or an organic material which is liquid at reactor operating temperatures, can be circulated among the fuel elements. If the coolant is water or an organic material, the same also can serve as the reactor moderator for slowing the fast fissional neutrons to velocities at which the greatest possibility exists for inducing fission. The reactor is controlled by the insertion of control rods or other material, containing neutron absorbers, into the reactor in order to maintain a chain reaction at a given power level by the absorption of excess neutrons.

Contrary to prevailing beliefs, a nuclear reactor is not a relatively low temperature device, but is only so limited in its conventional forms by the character of the coolant materials which are employed. Another limitation involves the fact that, without special construction, a reactor is not readily capable of imparting superheat to a working fluid, such as steam. Both of these factors result in a rather inefficient use of conventional thermodynamic generating equipment usually associated with a reactor in a nuclear power plant.

The present invention is adapted for converting a portion of the total reactor thermal output directly into electrical energy and in doing so the conversion takes place in the areas of high temperature gradient within the reactor core, that is to say before the fissional heat is dissipated into the reactor coolant. Accordingly, no heat energy is lost during the direct-conversion process.

In view of the foregoing, an object of the present invention is to provide a novel and efficient means and method for converting thermal energy directly into electrical energy.

Another object of the invention is the provision of a novel thermionic converting means adapted for use within a nuclear reactor.

Another object of the invention is the provision of a novel and efficient nuclear fuel element, which is adapted for converting a portion of the fissional heat thereof directly into electrical energy.

Another object of the invention is the provision of a novel and efficient form of thermionic converter. More specifically it is an object of the invention to provide means for mounting and operating a relatively large number of such converters in electrical series or series-parallel arrangements to obtain usable quantities of electrical energy.

Another object of the invention is the provision of novel means for reducing the space charge of a thermionic converter and thereby for increasing the efficiency of the converter.

A further object of the invention is the provision of a novel and efficient fuel element for a nuclear reactor. It is more specifically an object of the invention to combine a reactor fuel element with a thermionic converter in a novel and efficient manner.

These and other objects, features and advantages of the invention will be elaborated upon during the forthcoming description of illustrative modifications thereof, with the description being taken in conjunction with the accompanying drawings wherein:

FIG. 3 is an elevational view, partially in section, of an exemplary reactor fuel assembly constructed in accordance with the teachings of this invention;

In accordance with the invention, a novel arrangement is provided for combining a thermionic energy coverter, such as that disclosed in G. R. Feaster's Patent No. 2,980,819, entitled "Thermal Energy Converter," issued April 18, 1961, and assigned to the present assignee, with a reactor fuel element or assembly. Further, as taught by the invention, means associated in a novel manner both with the reactor and with a fuel element converter 10 are employed for reducing the space charge thereof.

Figure 1:
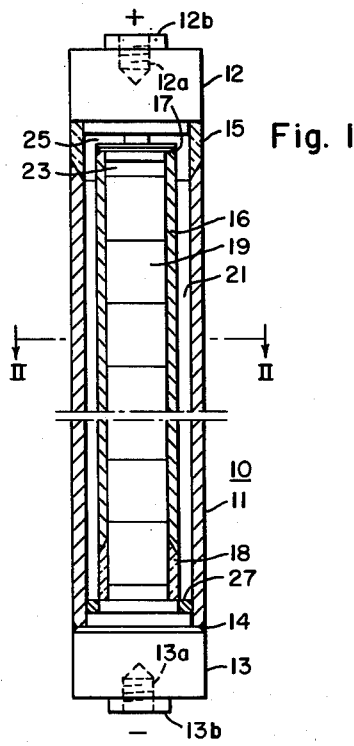
FIGURE 1 is a longitudinally sectioned view of an exemplary form of the reactor fuel element constructed in accordance with the invention.
Figure 2:
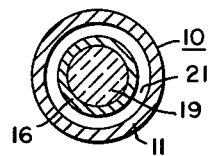
FIG. 2 is a cross-sectional view taken along reference lines II—II of FIG. 1 and showing the fuel element thereof.

Referring now to FIGS. 1 and 2 of the drawings, an illustrative form of the fuel element-converter is depicted therein. The converter 10, in this arrangement, includes an envelope 11, which is joined at its ends to stepped plug members 12 and 13. To the end plug 13 the envelope 11 is hermetically sealed by an annular weld 14. Adjacent the other end of the envelope 11, the envelope includes an annular portion of electrically insulating material 15, for example fused aluminum oxide, which is hermetically sealed both to the stepped end plug 12 and to the envelope 11 in a well known manner. In this arrangement of the invention, the envelope 11 serves as the anode of the converter 10 and electrical contact is supplied thereto through the end plugs 13, which is labeled negative in FIG. 1. For purposes presently to be described, the other end plug 12 is insulated from the anode or envelope 11 by means of insulating portion 15. Each of the end plugs 12 and 13 is provided with a tapped aperture 12A or 13A and a protruding annular portion 12B or 13B for the purposes of securing the converter 10 to insulating end plates 38 and 40 described hereinafter in connection with FIG. 3.

Spaced inwardly of the envelope 11 is a cladding tube 16, which is assembled in a manner similar to that of the envelope 11 to stepped portions of the end plugs 12 and 13. Thus, for example, the upper end of the cladding tube 16 is hermetically sealed to the end plug 12 by means of an annular weld 17. Adjacent the lower end of the cladding tube 16 is an annular insulating portion 18, which similarly is joined to a stepped portion of the end plug 13 and to the remainder of the cladding tube 16 in a well known manner. Thus, the insulating portion 18 is formed and assembled in the manner described in connection with the insulating portion 15.

In this arrangement of the invention, the cladding tube 16 serves the dual function as cathode for the converter 10 and also as a hermetic container for the fuel or fissile material denoted generally by the reference character 19 and described hereinafter in greater detail. Electrical contact with the cathode or cladding tube 16 is provided through the end plug 12, which is labeled + in FIG. 1. The cathode 16, of course, is insulated from the other end plug 13 by means of the annular portion 18. An annular space 21 between the cladding tube 16 and the envelope 11 desirably is of the order of 1 millimeter in radial distance, or less, in order further to reduce the effects of a space charge in the converter 10.

The fuel material 19 in this example of the invention includes a plurality of pellets which are tandemly inserted into the cladding tube 16 in a well known manner. An expansional space 23 is provided within the cladding tube 16 to permit differential thermal expansion between the cladding tube 16 and the fuel material 19. In furtherance of the same purpose, the innermost stepped portion of the end plug 12 is undercut denoted by the reference character 25 to afford differential expansion between the cladding tube 16 and the envelope 11. If desired, the lower end plug 13 can be similarly provided with an undercut portion (not shown) for this purpose.

The fuel material 19 desirably consists essentially of a compound or alloy of uranium or plutonium which is able to withstand elevated temperatures without melting inasmuch as the surface temperature of the cathode or cladding tube 16 should operate in the neighborhood of 1000° C. or higher. Suitable fuel materials include plutonium or uranium carbide, which can be admixed in a graphite matrix if additional moderation is desirable. Also recommended are uranium or plutonium oxides, zirconium-uranium alloys and cermets of uranium or plutonium compounds.

In this embodiment of the invention, the space 21 is evacuated in a well known manner and a source of alkali metal 27 is inserted within the space 21 before assembly of the converter 10. The source 27 can be the alkali metal itself or a suitable alkali metal compound mixed with a suitable reducing agent, which upon heating liberates the alkali metal. As the reactor is being brought to operating temperatures, alkali metal vapors will of course be liberated from the source 27 and will at least partially be located between the cathode 16 and the anode 11. The intervening space 21 of course has been previously evacuated and inasmuch as the cladding tube 16 and the envelope 11 are hermetically sealed, the alkali metal vapor is the only gaseous material within the space 21.

The alkali metals lithium (5.36 volts); sodium (5.11 volts); potassium (4.33 volts); rubidium (4.13 volts) and cesium (3.86 volts) are suitable for use in this invention. The figures within the parenthesis refer to the ionization potential of the respective materials. The cladding tube 16 can be fabricated from a number of materials, but it is important that it can withstand the operating temperatures of the converter 10 and particularly that the cladding tube can be heated sufficiently so that its outer or emissive surface will produce substantial thermionic emission during operation of the converter. Desirably, the emissive surface is at least 1000° C. during operation.

Desirably, the work function of the cladding tube material should be higher than the ionization potential of the alkali metal employed to ensure contact ionization of the alkali atoms in the material vaporized from the source 27. However, the selection of the cathode material for this purpose is not critical, inasmuch as in accordance with the invention the gamma radiation normally associated with one application of reactor operation will ionize the alkali metal vapors. A suitable cathode or cladding tube 16, then, can be fabricated from the following materials: niobium (2415° C., 4.0 volts, 1.1 barns); zirconium (1857° C., 4.13 volts, 0.18 barn); molybdenum (2620° C., 4.3 volts, 2.5 barns); palladium (1555° C., 5.0 volts, 8.0 barns); and platinum (1773° C., 6.3 volts, 8.1 barns). The figures in parenthesis refer to the melting point, the work function, and the neutron absorption cross-section, respectively, of each of the foregoing metals. For most reactor applications, the first three materials are preferable due to their low neutronic capture cross-section. Where this factor is not of importance, the following cathode materials can also be employed: osmium (2700° C., 4.7 volts, 14.7 barns); tungsten (3395° C., 4.54 volts, 19.2 barns); and tantalum (2996° C., 4.07 volts, 21.3 barns).

By the same token, nuclear considerations render the alkali metals rubidium (4.13 volts, 0.70 barn); potassium (4.33 volts, 1.97 barns); and sodium (5.11 volts, 0.505 barn); more acceptable for most reactor applications. Where this fact is not critical cesium (3.86 volts, 29 barns) and lithium (5.36 volts, 71 barns) can be employed. The figures in parenthesis refer to the work function and the neutronic capture cross-section of these materials respectively.

The anode or envelope 11 is fabricated from a material which is substantially unreactive with the alkali metal, when used. The anode material must also be sufficiently refractory to withstand the temperature of operation which, in general, will be a few hundred degrees below the temperature of the cathode 16. The temperature of the anode 11 must be below the temperature of the cathode 16 during operation as thermionic energy converters will not function properly if the cathode and the anode are at the same temperature. Within certain limitations, the greater the temperature difference between the cathode 16 and the anode 11, the more efficiently the device will operate until this differential becomes so great that other undesirable effects occur. To provide a suitable temperature differential, the envelope or anode 11 of the converter 10 is suitably cooled by the reactor coolant flowing past the envelope 11, as described in greater detail in connection with subsequent figures.

With respect to work function, there is no restriction on the choice of anode material and if desired, the anode 11 can be fabricated from the same material as the cathode or from one of the other previously listed cathode materials. Desirably, however, the work function of the anode 11 is lower than that of the cathode 16 and is lowered still further by a coating of the alkali vapor upon the anodal surface of the envelope 11. Maintaining a differential of work function between the cathode and anode of course increases the electrical output of the converter 10. In an alternative embodiment, the source 27 of alkali metal is omitted and after evacuating the space 21, the latter is filled with helium. The helium fill is ionized by gamma radiation during operation of the reactor in order to counteract the effects of the space charge in the converter 10. The positive helium ions operate to neutralize the space charge in the same manner as the ionized alkali metal vapors. In the latter arrangement of the invention, the work function of the cathode material can be lower, as it is no longer necessary to ensure contact ionization of an alkali metal vapor. On the other hand, the work function of the anode material should be substantially lower than that of the cathode in order to secure a suitable voltage output.

In the operation of the converter 10, when the cathode 16 is heated to a sufficiently high temperature, electrons will be emitted from the surface of the cathode and will travel toward the anode 11. When connected to an external load, these electrons appear as current flowing through the end plug 13 and thence through suitable external connections (not shown) to the load and back to the end plug 12 for delivery to the cathode 16. The migration of electrons from the cathode 16 to the anode 11 across the space 21 is facilitated by the presence of positive ions within the space 21. To neutralize the cloud of electrons, otherwise known as a space charge, which would tend to form around the cathode 16, a relatively large number of either alkali metal or helium ions are necessary. These are afforded not only by the ionizing radiation associated with the reactor but also by operating the converter 10 in a region of relatively high ambient temperature. Satisfactory results have been obtained when the gaseous filling of the converter 10 is maintained between 0.01 and 20 millimeters of mercury. The high ambient temperature results from the fact that the normal reactor coolant temperature is in the neighborhood of 600° F. or higher. Specific constructional details and other parameters of a heterogeneous reactor similar to that described herein are found in a copending case of R. J. Creagan, entitled "Neutronic Reactor," Serial No. 686,778, filed September 27, 1957, and assigned to the present assignee.

Figure 4:
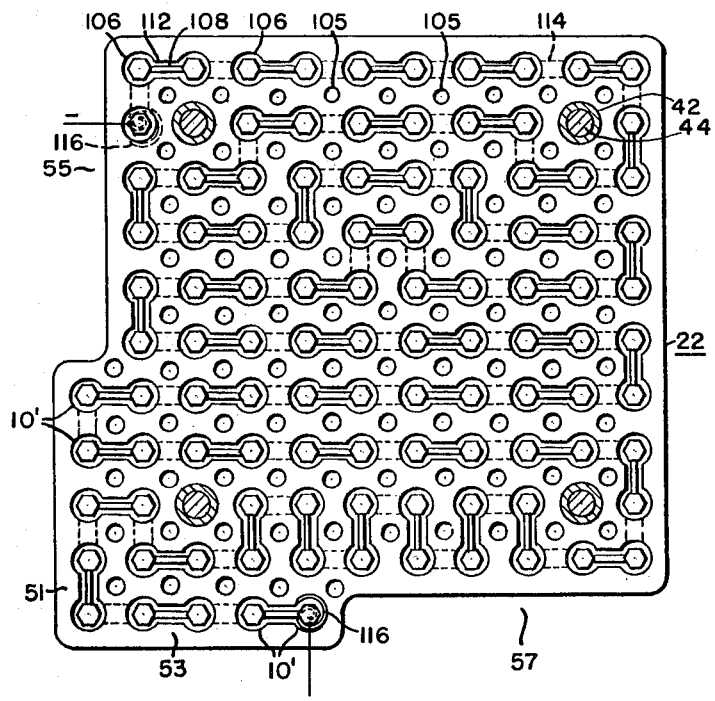
FIG. 4 is a cross-sectional view taken along line IV—IV of FIG. 3 and showing the reactor fuel assembly thereof.

Referring now to FIGS. 3 and 4 of the drawings, an illustrative form of fuel assembly 20, adapted for supporting a plurality of the fuel element-converters 10, is illustrated therein. The latter arrangement of the invention comprises a fuel bundle indicated generally by the reference character 22, to each end of which is secured a flow nozzle assembly 24 or 26, respectively. Each of the flow nozzle assemblies 24 and 26 includes in this example a flanged flow nozzle 28 and a mounting plate 32. The aforesaid component parts of the nozzle assembly 24 or 26 are spaced from one another by a number of spacers 34, with four being employed in each nozzle assembly 24 or 26 in this example of the invention.

The pair of mounting plates 32, which are individually arranged at positions adjacent end plates 38 and 40 of the fuel element bundle 22, are each separated by a number of tie rod sleeves 42 passing through the fuel bundle 22 and bearing against the opposing surfaces of the mounting plates 32. For the purpose of electrically insulating the aforesaid mounting plates 32, the tie rod sleeves are fabricated from a ceramic-material such as aluminum oxide. The assembly of the nozzles 28, their associated components, and the fuel element bundle 22 are secured together by means of tie rods 44 inserted individually through each of the aforesaid insulating sleeves 42 and secured to the nozzle assemblies 24 and 26 at the respective threaded ends by means of nuts 36. The mounting plates 32 and the remaining components of each flow nozzle assembly 24 or 26 are thus rigidly joined with the mounting plates bearing against the respective ends of the tie rod sleeves 42. In this arrangement then, each of the end plates 38 and 40 of the fuel bundle 22 are more or less slidably mounted upon the tie rod sleeves 42 as a result of the tie rod sleeves having been inserted and fitted relatively closely through appropriate apertures 46 formed in each of the end plates 38 and 40.

As will be explained hereinafter in greater detail, the fuel bundle 22 is made up of a plurality of converters 10 each of which is formed with a quantity of one or more of the fissile isotopes mentioned heretofore. Accordingly, when an adequate number of fuel assemblies 20 are arranged within a neutronic reactor for sustaining a chain reaction therewithin, individual converters 10 thereof, which contain the source of the heat output of the reactor will expand accordingly to a greater extent than the component structural parts of the fuel element assembly 20. For this reason, in order to permit relative expansion between the converters 10, and the component parts of the assembly, gaps 50 are provided initially between the end plates 38 and 40 and mounting plates 32 of the nozzle assemblies 24 and 26, respectively.

Each of the nozzles 28 is provided with a relatively large opening 52, which provides access and egress, as the case may be, for coolant fluid flowing through the fuel bundle 22 and more specifically through flow passages 56 provided within the fuel bundle 22 between adjacent ones of the converters 10 in a manner presently to be elaborated upon. The flow nozzles 28 are each secured by means of associated flange 30 and the nuts 36 to the tie rods 44, the ends of which are inserted into suitably disposed apertures 60 of the flange 30. Each flow nozzle 28 is further provided with a circumferentially projecting shoulder 64 which is arranged to engage the inner surface of the top and bottom supporting structures 97 and 98 (FIG. 6) of a reactor core, whereby the tubular end portions 66 of the nozzle 28 can be inserted into suitably spaced and aligned apertures formed respectively in the aforesaid supporting structures 97 and 98 and thus the fuel assembly 20 is suspended and positioned within the reactor core. The arrangement of fuel assemblies 20 with a reactor core, in this fashion, is shown in detail in the aforesaid copending application of Robert J. Creagan.

As shown more fully in FIG. 4 of the drawings, the fuel bundle 22 is formed with stepped portions 51 and 53 on adjacent sides thereof. These stepped portions are disposed thusly to form channels 55 and 57 between adjacent closely spaced fuel assemblies 20 for the insertion of control rods as described in the aforesaid copending application and subsequently in connection with FIG. 5 hereof. Additional converters 10' are mounted at the stepped portions in order to eliminate vacancies at these points within the fuel assembly 20. Otherwise these vacancies would induce neutronic flux peaking thereat due to an excess of coolant-moderator.

The flow nozzle 28 with its flange 30 and mounting plate 32 are insulated from the tie rods 44 in this example, by means of an elongated bushing 62 fabricated from an electrically insulating material such as one of the ceramics mentioned heretofore. The flange portion 63 of the bushing then operates to insulate electrically the nut 36 and associated washer 58 and tie rod 44 from the nozzle flange 30. Similarly, the inward sleeve portion 59 of the insulating bushing 62, which for ease of fabrication, can be furnished in two or more parts if desired, operates to insulate the mounting plate 32 from the tie rods 44 passing therethrough.

Each flow nozzle 28 is positioned precisely relative to the fuel bundle 22 and tie rods 44 by the insertion of the outward end portion 65 of the spacers 34 into complementing recesses 67 formed in the interior surface of the nozzle flange 30 and surrounding each aperture 60 thereof. The tie rod sleeves 42 are relatively thicker than the adjacent end portions of the bushings 62 in order that the ends of these sleeves will bearingly engage the inward surfaces of the mounting plates 32 to maintain the desired spacing therebetween.

As indicated heretofore, the fuel bundle 22 of the assembly 20 comprises a plurality of the converters 10, which in this application of the invention 105 are employed and which have been described in greater detail in connection with FIGS. 1 and 2 of the drawings. For the purpose of making electrical connections to the converters 10 comprising the fuel bundle 22, as to be described hereinafter in connection with FIG. 4, each of the converters 10 is relatively inverted with relation to adjacent ones of the converters 10, as better shown in the cutaway portion of FIG. 3. With this arrangement, then, the positive end plug 12 of one converter 10 can be connected to the negative end plug 13 of an adjacent converter.

In one example of the invention, the converters 10 are secured or suspended between the end plates 38 and 40 of the fuel assembly 20 and are secured at their respective extremities by means of fillister headed screws 100 inserted through suitable apertures 102 in the end plate 38 or 40 and threaded respectively into the tapped holes 12a or 13a (FIG. 1) provided at each end respectively of the converter 10. In order to precisely position each of the converters 10, each of the aforesaid apertures 102 are countersunk adjacent the inward openings thereof to receive the annular projections 12b or 13b (FIG. 1) of the converter 10. These projections fit relatively closely within the aforesaid countersunk portions and thus the converters 10 are precisely spaced from one another in order to provide the required flow passages 56 therebetween in order to preserve the required spatial distribution of the nuclear fuel within the reactor core. The aforesaid flow passages 56 each communicate with the openings 52 in the flow nozzles 28, through a like number of aligned apertures 105 formed in each of the end plates 38 and 40 and the mounting plates 32, as better shown in FIG. 4 of the drawings.

In order to recess each of the heads of the screws 100 below the outer surface of each end plate 38 or 40, a recess 106 is formed about the outer opening of each of the apertures 102. In this arrangement, of the invention, the fillister headed screws 100 together with the conductive components of each converter 10 are insulated from like components of adjacent fuel elements by forming each of the end plates 38 and 40 from an electrically insulating material, for an example one of the aforementioned ceramics. In furtherance of this purpose, the heads of the screws 100 are depressed below the outer surfaces of the end plates as aforesaid in order to avoid contacting the metallic and conductive mounting plates 32 upon thermal expansion of the fuel bundle 22 longitudinally along the length of the tie rod sleeves 42. When insulated from one another in this fashion, the converters 10 are connected in electrical series with one another, as better shown in FIG. 4 of the drawings, by means of electrically conductive straps 108 and 110. The conductive straps 108 and 110 likewise are depressed in the outer surface of the end plates 38 and 40, respectively, of the fuel bundle 22 by means of grooves 112 and 114 provided for this purpose and connecting certain ones of the depressions 106 surrounding the heads of the screws 100. The conducting straps 108 and 110 can be secured to adjacent pairs of the fillister headed screws 100 and thence to the converters 10, in any convenient manner such as by spot welding the straps to the respective screw heads.

In one illustrative application of the invention, the converters 10 are provided with a length of about 100 inches while the diameter of the fuel material 19 is about 300 mils. The cladding tube 16 and the envelope 11 each can be from 5 to 15 mils in thickness depending upon the workability of the materials employed therefor and upon internal reactor pressure. As pointed out previously, the width of the intervening space 21 should be as small as feasible and, considering manufacturing techniques, the space 21 (FIG. 1) can be on the order of 0.1–5 mm. If it is desired to employ converters 10 of less than the indicated length, while still preserving the indicated height of the reactor core, two or more of the converters can be supported in tandem along the length of the fuel bundle 22 in a manner disclosed in a copending application of W. E. Sturtz and E. Frisch, entitled "Rod Type Fuel Assembly," filed November 2, 1956, Serial No. 620,071, and assigned to the present assignee. Obviously, the shorter fuel elements can be insulated in the manner such as that taught herein in connection with FIGS. 3 and 4.

From the foregoing, it will be apparent that a very compact combination fuel element and thermionic converter 10 has been disclosed herein. The compactness of the converters 10 enable a relatively large number of these devices to be assembled in a generally parallel array in each fuel assembly 20. Although the converters 10 of each fuel assembly 20 have been described as being connected in electrical series, obviously the converters 10 can be coupled in series-parallel or in parallel electrical arrangements in the well known manner. In the latter case, where all of the converters 10 of a given fuel assembly 20 are coupled in electrical parallel, the end plates 38 and 40 need not of course be fabricated from an insulating material. The end fuel element-converters 10 of the electrical series or series-parallel arrangement, for example the series arrangement of FIG. 4, are connected electrically to the conductive mounting plates 32 respectively by means for an example of a spring biased electrode 116 inserted between the associated fillister headed screw 100 and the adjacent mounting plate 32, as better shown in FIG. 4 of the drawings. In this manner, electrical contact will be maintained despite thermally induced movements of the end plates 38 and 40. The remainder of the nozzle assemblies 24 and 26 having likewise been fabricated from an electrically conductive material then serves as a means for making electrical connection to the series coupled converters 10 in the bundle 22. As indicated heretofore, these flow nozzle assemblies 24 and 26 are electrically insulated from the tie rods 44 and other component parts of the assembly 20 and hence from one another by means of the insulating members 62 and 63. Therefore, as shown in FIGS. 3 and 4, the upper flow nozzle assembly 24 is the positive terminal of the series-connected converters 10 while the lower nozzle assembly 26 is the negative terminal.

Figure 5:
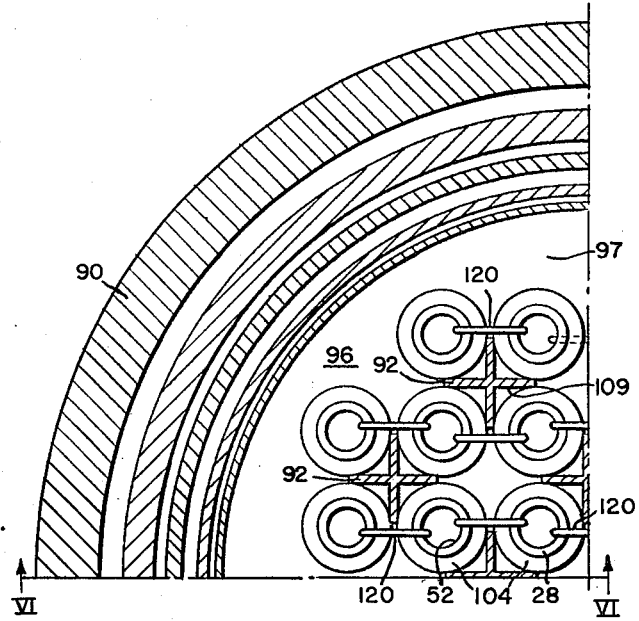
FIG. 5 is a partial cross-sectional view of one form of heterogeneous reactor with which the fuel assembly of the invention is adapted for use, with the view being taken generally along reference line V—V of FIG. 6.
Figure 6:
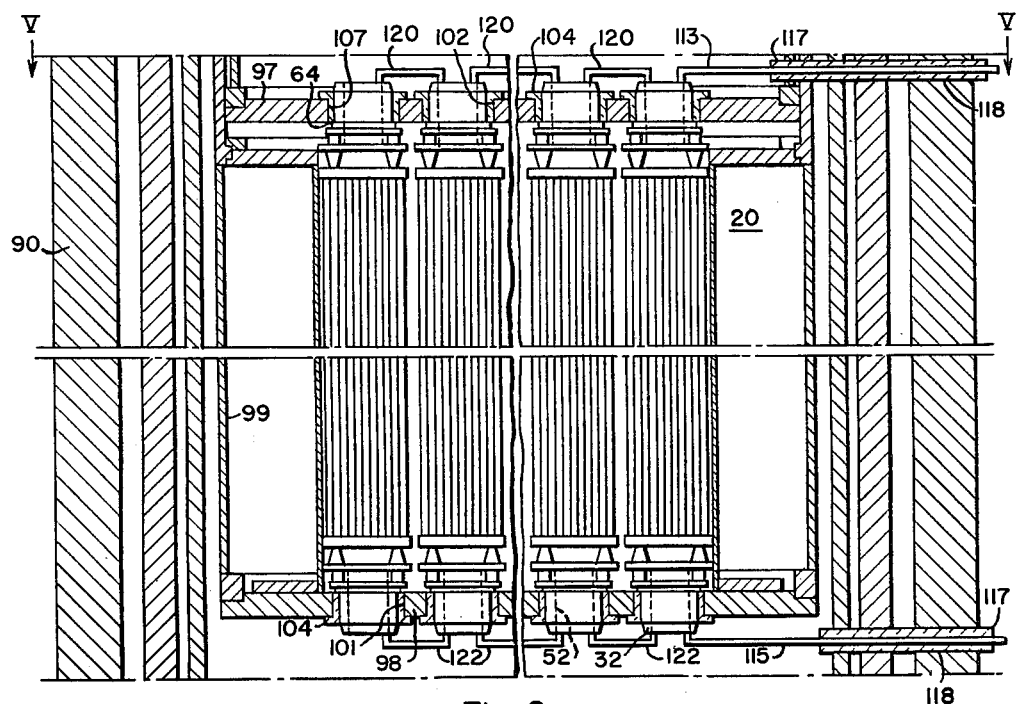
FIG. 6 is a longitudinally sectioned view of the reactor shown in FIG. 5 and taken generally along reference line VI—VI thereof.

Referring now to FIGS. 5 and 6 of the drawings, a plurality of the fuel assemblies 20 are supported within a nuclear reactor core 96 partially illustrated in the drawings and comprising an upper core supporting plate 97 and a lower core supporting plate 98, both of which are joined to a cylindrical core casing member 99. The reactor core 96 is supported, by suitable structure (not shown), within a closed reactor vessel indicated generally at 90. Structural and operational details of the nuclear reactor and component equipment are presented in the aforesaid copending application of Robert J. Creagan. Accordingly, a more detailed description of the heterogeneous type reactor described therein, and with which the fuel element and assembly of the present invention is intended to be employed, is not deemed necessary.

Each of the upper and lower core supporting plates 97 and 98 are provided with a plurality of aligned apertures 102 and 101, respectively, into each of which is inserted a flanged ceramic insulating bushing or member 104. In this example, the insulating members 104 are fabricated from one of the ceramic materials noted heretofore. The fuel assemblies 20 are suspended spacedly within the reactor core 96 by insertion of the flow nozzles 28 thereof respectively into aligned pairs of apertures 101 and 103, with the fuel assemblies 20 being positioned longitudinally of the reactor core 96 by engagement of nozzle shoulders 64 with the inwardly extending extremities 107 of the insulating members 104, respectively. A plurality of control rods 92, desirably of cruciform configuration, are inserted between selected groups of the fuel assemblies 20, through suitable apertures 109 (FIG. 6) provided in the upper core supporting plate 97 and into the channels 55 and 57 adjacent the stepped portions 51 and 53 (FIG. 4) of the assemblies 20, for the purpose of appropriately controlling the chain reaction sustained within the reactor core 96.

Each of the fuel assemblies 20 thus are insulated electrically from the upper and lower core supporting plates 97 and 98 and consequently from one another by the intervention of the aforesaid insulation members 104. More importantly the latter members prevent the positive and negative terminals of the series-connected converters 10 from being short-circuited through the core casing 99. With this arrangement, all of the fuel assemblies 20 of the reactor core 96 can be connected either in electrical series, or in this example in parallel, by upper and lower electrically conductive straps or bars 120 and 122 respectively, as better shown in the drawings. Although it is contemplated that all of the fuel assemblies 20 of the reactor core 96 be coupled in parallel; for purposes of illustration, only those fuel assemblies shown in the northwest quadrant of the reactor core, as illustrated in FIGS. 5 and 6 are so coupled. The direct electrical output of the reactor is withdrawn therefrom by means of electrical leads 113 and 115. As better shown in FIG. 6, the leads 113 and 115 extend outwardly through the wall of the reactor vessel 90 and are insulated electrically therefrom by means of a pair of cylindrical insulators 117 individually inserted through apertures 118 in the wall of the reactor vessel and hermetically sealed thereto and to the conductors 113 and 115, respectively.

With the arrangement shown and depending upon the respective work functions of the materials of the cathode 16 and anode 11 of each converter 10, it is contemplated that the electric output potential of the reactor shown in FIGS. 5 and 6 will lie between 100 and 200 volts. Another factor affecting the voltage output of course will be the type and the amount of ionized gas or vapor in the spaces 21 (FIG. 1) of the converters 10. Inasmuch as a relatively large number of fuel assemblies 20 are employed in a power reactor and as in this application they are coupled in electrical parallel, it is obvious that the voltage output can be supplied at a substantial current rating. It is contemplated of course that if higher voltages are desired, the fuel assemblies can be coupled in series or series-parallel arrangements in the well known manner.

With reference to the converter 10 as illustrated in FIGS. 1 and 2, it is contemplated that the cathode 16 thereof can be heated by a high temperature fluid rather than by the fissile material 19. In furtherance of this latter purpose, the material 19 can be omitted and the cladding tube 16 can be extended completely through the converter as a tubular conduit open at either end. The tubular conduit can be insulated from the envelope or anode 11 in a manner which is obvious from the teachings of the present invention. It is also contemplated that the aforementioned space charge can be at least partially eliminated or compensated by spacing the cathode or cladding 16 and the anode or envelope 11 very closely, depending upon allowable manufacturing tolerances.

It is further contemplated that the pellets shown in FIG. 1 of the drawings and the cladding tube 16 can be eliminated and a solid rod of fuel material substituted therefor. The rod of fuel material can be joined to the end plugs 12 and 13 in a manner similar to that described previously in connection with the cladding tube 16. Preferably, of course, the rod of fuel material is fabricated from a material which is a good electron emitter, such as a mixture of uranium carbide and zirconium carbide.

From the foregoing, it will be apparent that novel and efficient forms of a thermionic converter, particularly in combination with a nuclear fuel element and fuel assembly, have been disclosed herein. Numerous modifications of the invention will appear to those skilled in the art to which it pertains without departing from the spirit and scope of the invention. Moreover, it is to be understood that certain features of the invention can be employed without a corresponding usage of other features thereof. Accordingly, the descriptive materials presented herein are intended as illustrative rather than limitative of the invention.

Therefore, what is claimed as new is:

1. A fuel element-converter, adapted for use in a nuclear reactor, said converter comprising a generally tubular anodic envelope, a cathodic cladding tube spaced inwardly of said envelope and capable of electron emission, means for sealing the ends of said envelope and said tube respectively, means for electrically insulating said envelope from said tube a mass of fissile material contained within said tube, means for making electrical contact to said tube and to said envelope and an ionizable material contained in the space between said tube and said envelope, said material being capable of ionization by the gamma radiation normally associated with said reactor.

2. A fuel element-converter, (adapted for use in a nuclear reactor), said converter comprising a generally tubular anodic envelope, a cathodic cladding tube spaced inwardly of said envelope and electrically insulated therefrom, means for sealing the ends of said envelope and said tube respectively, a mass of nuclear fuel material contained within said tube and capable of fissioning so as to sustain a chain reaction when placed in a lattice array of similar fuel-element converters, means for making electrical contact to said tube and to said envelope and a vaporizable and ionizable material contained in the space between said tube and said envelope, said material being capable of vaporization by reactor heat at operating temperatures thereof and being further capable of ionization by the gamma radiation normally associated with said reactor.

3. A fuel element-converter comprising a generally tubular anodic envelope, a cathodic cladding tube spaced inwardly of said envelope, a conductive supporting member joined at each end of said converter to the adjacent ends of said envelope and said tube respectively, said envelope including an insulating member interposed between said envelope and one of said supporting members adjacent one end of said converter, said cladding tube including a second insulating member interposed between the conductive portion of said tube and the other of said supporting members adjacent the other end of said converter, means for making electrical contact with said envelope through said one supporting member and with said tube through said other supporting member, a mass of fissile material contained within said tube, and yieldable means forming part of one of said supporting members and sealed to the adjacent end of one of said tube and said envelope to permit differential thermal elongation between said tube and said envelope.

4. A fuel element-converter adapted for use in a nuclear reactor comprising a generally tubular anodic envelope, a cathodic cladding tube spaced inwardly of said envelope in electrically insulating relationship therewith and capable of electron emission, means for sealing the ends of said envelope and said tube respectively and capable of fissioning so as to sustain a chain reaction when placed in a lattice array of similar fuel-element converters, a mass of fissile material contained within said tube, said tube being in a heat transfer relationship with said material whereby said tube is heated during reactor operation, and means for electrically connecting said tube and said envelope to an external circuit.

5. A fuel element-converter adapted for use in a nuclear reactor comprising a generally tubular anodic envelope, a cathodic cladding tube spaced inwardly of said envelope in electrically insulating relationship therewith, a mass of fissile material contained within said tube, means for sealing the ends of said envelope and said tube respectively so as to form a double barrier, said tube being in a heat transfer relationship with said fissile material whereby said tube is heated during reactor operation, and the spacing of said tube and said envelope being relatively close so that the space charge normally associated with said cathode is at least partially eliminated.

6. A fuel element-converter adapted for use in a nuclear reactor comprising a generally tubular hermetically sealed anodic envelope, a hermetically sealed cathodic cladding tube spaced inwardly of said envelope in electrically insulated relationship therewith, a mass of nuclear fuel material contained within said tube and capable of fissioning so as to sustain a chain reaction when placed in a lattice array of similar fuel-element converters, said tube being in a heat transfer relationship with said nuclear fuel material whereby said tube is heated during reactor operation, an alkali metal vapor located at least partially between said anodic envelope and said cathodic tube during operation, said cathodic tube having an electron emissive surface having a work function greater than the ionization potential of said alkali metal, said electron emissive surface, during operation, being at a temperature adequate to produce substantial thermionic emission and being at a higher temperature than said anodic envelope.

References Cited by the Examiner

UNITED STATES PATENTS

| | | | |
|---|---|---|---|
| 2,728,867 | 12/55 | Wilson | 176—68 X |
| 2,758,225 | 8/56 | Annis et al. | 310—3 |
| 2,858,459 | 10/58 | Schwarz | 310—3 |
| 2,864,012 | 12/58 | Thomas et al. | 310—3 |
| 2,900,535 | 8/59 | Thomas | 310—4 |
| 2,980,819 | 4/61 | Feaster | 310—4 |
| 3,005,766 | 10/61 | Bartnoff | 136—4 |
| 3,008,890 | 11/61 | Bartnoff | 136—4 |
| 3,054,914 | 9/62 | Hatsopoulos | 310—4 |
| 3,093,567 | 6/63 | Jablonski et al. | 176—52 |

OTHER REFERENCES

Nucleonics, vol. 17, July 1959, pp. 49–55 (page 51 in particular).

CARL D. QUARFORTH, *Primary Examiner.*

ROGER L. CAMPBELL, REUBEN EPSTEIN,
*Examiners.*